United States Patent Office 3,699,112
Patented Oct. 17, 1972

3,699,112
PAPER COATING PIGMENT BINDER OF ALCO-HOLIZED VINYL ACETATE-ACRYLAMIDE COPOLYMER
Kozo Konishi, Masaaki Suzui, Michio Otake, and Tatuo Maeda, Nishi Kubiki-gun, Japan, assignors to Denki Kagaku Kogyo Kabushiki Kaisha, Tokyo, Japan
Filed Mar. 11, 1969, Ser. No. 806,213
Claims priority, application Japan, Mar. 18, 1968, 43/17,281; Mar. 27, 1968, 43/19,442
Int. Cl. C08g 51/24
U.S. Cl. 260—29.4 UA
7 Claims

ABSTRACT OF THE DISCLOSURE

A paper coating composition having an improved fluidity and water resistance can be obtained by using as a pigment binder an alcoholysis product of vinyl acetate-acrylamide copolymer or a copolymer of vinyl acetate, acrylamide and one or more other copolymerizable monomer, or the product added with a water resistance agent without lessening the inherent characteristic of PVA.

BACKGROUND OF THE INVENTION

The present invention relates to a paper coating pigment binder having an improved printing property.

It is well known to apply to paper and paper board (hereinafter referred to as "paper") a coating material, commonly called "color," containing a pigment, for the purposes of ornamentation, to reduce surface roughness, to render the surface more uniform and to provide a smooth surface with satisfactory ink-acceptability for printing thereon. Clay is commonly used as the pigment while calcium carbonate and titanium oxide are also used along with a suitable binder such as starch, casein or other protein, styrene-butadiene copolymer latex, acrylic resin, etc.

In general, the amount of binder is preferably small in order to keep the optical properties such as whiteness, opacity, gloss, etc., as high as possible. On the other hand, as the amount of binder is decreased, there is loss of strength in the bond between the coating and the paper as well as in the coating itself. In such known compositions, accordingly, there are by weight about 12 to 20 parts binder per 100 parts pigment.

Polyvinyl alcohol (hereinafter referred to as "PVA") has been found to be a strong binder which can be used in small proportions in coating compositions thereby yielding a coated paper with excellent optical properties.

For example, the coated surface obtained with a color containing, by weight, 3-4 parts PVA as a binder per 100 parts pigment has substantially equal strength with superior optical properties to the coated surface obtained from a color containing, by weight, 18 parts starch as a binder per 100 parts pigment.

While PVA thus shows excellent optical properties as a pigment binder, its fluidity and water-resistance present problems. In applying a color having PVA as the binder using a blade coater, the extremely high shearing force results in the defect called "streak" on the coated surface, whereas if a roll coater or size press is used the coating irregularity called "pattern" is encountered, thus lowering the quality of the coated paper.

Various proposals have been made regarding these problems. Thus, an acidic catalyst has been incorporated in the composition to improve the water-resistance of the PVA. This method, however, requires heat treatment at a relatively high temperature for a relatively long time and sufficient initial adhesion cannot be obtained by drying and a short heating step so that the resulting coating suffers from the defect of being sticky.

As the result of study for obtaining an excellent pigment binder for color coating by improving the fluidity and water resistance of PVA used as a pigment binder without lowering its excellent inherent properties, the present inventors have found that a color having an improved fluidity and water resistance, can be obtained by using as a pigment binder an alcoholysis product of vinyl acetate-acrylamide copolymer or a copolymer of vinyl acetate, acrylamide and one or more other copolymerizable monomer, or the product added with an increasing water resisting, agent without lessening the inherent characteristic of PVA.

SUMMARY OF THE INVENTION

The pigment binder of the present invention can be obtained by alcoholyzing the vinyl acetate-acrylamide copolymer, or the copolymer of vinyl acetate, acrylamide and one or more other copolymerizable monomer and it is important that the pigment binder has an appropriate acrylamide content, alcoholysis degree of vinyl acetate and polymerization degree so that the color containing the pigment binder of the present invention may have an excellent fluidity.

DETAILED DISCLOSURE OF PREFERRED EMBODIMENT

Figure 1:
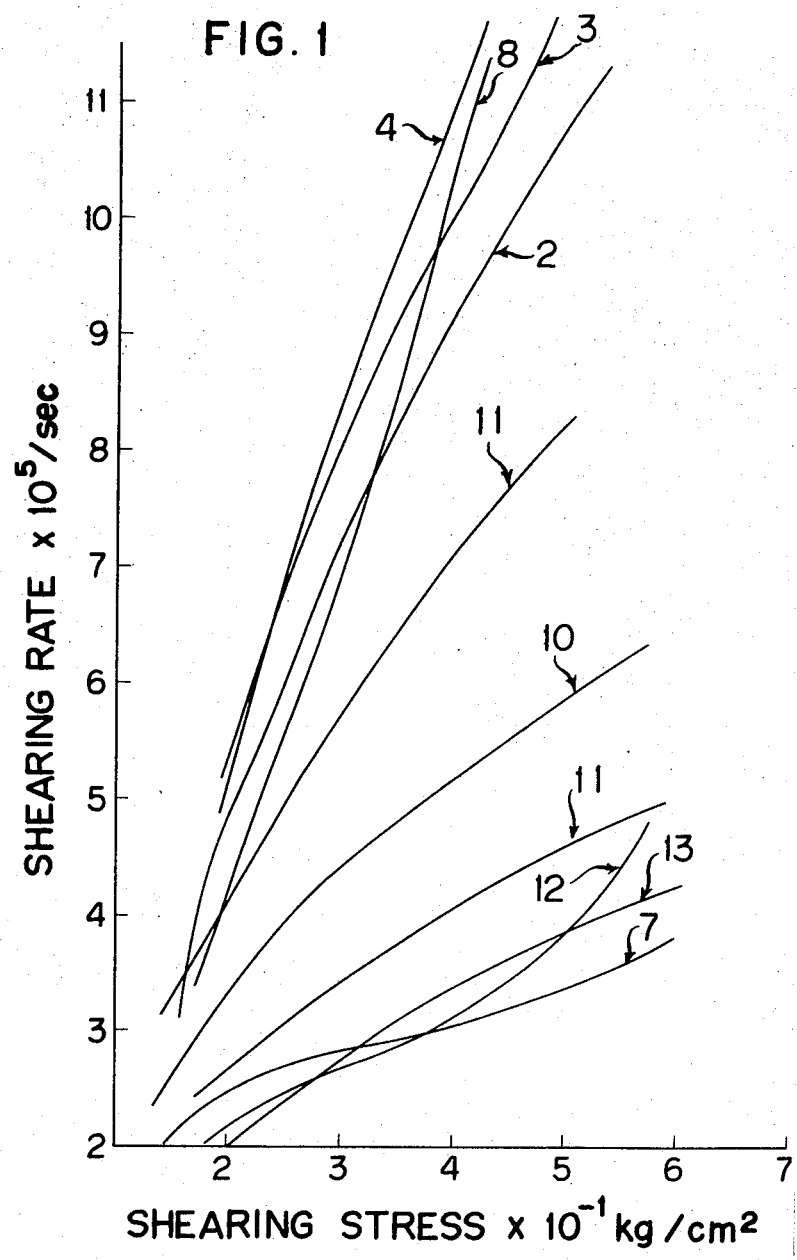
FIGS. 1 and 2 show the fluidity of color, which is measured in Example 2.

The vinyl acetate-acrylamide copolymer or the copolymer of vinyl acetate, acrylamide and one or more other copolymerizable monomer which is used in the present invention is obtained by adding on polymerizing vinyl acetate acrylamide or vinyl acetate, acrylamide and one or more other copolymerizable monomer thereto and copolymerizing therewith, and, desirably, acrylamide or acrylamide and one or more other copolymerizable monomer is distributed uniformly in the resulting copolymer.

In the copolymerization of vinyl acetate and acrylamide, the reactivity ratio of the former monomer is 0.09 and of the latter monomer is 7.5; and therefore it is better in order to obtain a uniform copolymer to copolymerize the monomers by adding the acrylamide gradually to the vinyl acetate during the polymerization reaction.

As other monomers copolymerizable with vinyl acetate and acrylamide, acrylic acid, methacrylic acid, acrylic ester, methacrylic ester, acrylonitrile, crotonic acid, maleic acid anhydride, α-olefine, vinyl ether, trialkyl vinyl acetate ester, acryl acetate, isopropenyl acetate, etc. may be used.

The amount of acrylamide contained in these copolymers is preferably in the range of from 1 to 30 mol percent.

In order that the physical properties such as surface strength, water-resistance, etc. of the paper coated with the color containing the pigment binder of the present invention may be satisfactory, a high degree of alcoholysis of the vinyl acetate in the polymer binder is desirable. And more than 75 mol percent of the vinyl acetate and acrylamide copolymer or the copolymer of vinyl acetate, acrylamide and one or more other copolymerizable monomer is desirably alcoholized since the alcoholysis product is obtained in the form of powder and can be easily treated.

Similarly, in order that the surface strength and water-resistance of the coating obtained from a color using these copolymers as a binder may be satisfactory, the average polymerization degree of the alcoholysis product of the copolymer is preferably above 800. There may be admixed with these copolymers other compounds which are conventionally used to improve water-resistance, such as melamine Formalin, urea Formalin, benzoguanamic Formalin, etc., and a compound having many aldehyde groups such as a dialdehyde compound, for example, glyoxal, glutaraldehyde, etc., and a dialdehyde starch.

While the amount of such water-resisting additive depends upon the desired effect, it is usually within the range 1 to 30% by weight based upon the amount of the alcoholysis product of the copolymer. When the amount is less than 1%, by weight, the effect of improvement in water-proofness is not sufficient, and when more than 30%, by weight, the color stability is poor.

Preferably, these increasing water-proofing agents are to the aqueous solution of alcoholysis product under stirring so as to be dispersed uniformly.

The product so obtained is excellent in storage stability at the room temperature, and the color involving the product as a binder exhibits an excellent water-resistance by only treating it under heating for short period after coating.

EXAMPLE 1

6200 parts of vinyl acetate, 2277 parts of methanol, and 6.2 parts of 2,2'-azobisisobutyronitrile were supplied in a polymerization reactor while replacing with nitrogen gas. After heating, when the reflux from a water-cooling reflux condensor started, 1904 parts of methanol solution containing 381 parts of acrylamide was added dropwise uniformly for 120 minutes and then the polymerization reaction was continued for 8 hours to obtain a methanol solution of vinyl acetate-acrylamide copolymer, and, thereafter, about 20% of unpolymerized monomer (vinyl acetate) was removed by means of the conventional method.

Subsequently, methanol was added to the solution to adjust the concentration of copolymer to 40%, and sodium hydroxide was added thereto in $\frac{1}{25}$ mol equivalent to vinyl acetate contained in the copolymer and the alcoholysis reaction was carried out in the absence of moisture at a temperature of 40° C. for 2 hours. The alcoholysis product of copolymer obtained in the absence of moisture was a white powder having 1200 of powder having a polymerization degree of 1200, alcoholysis of acetate groups 99.7 mol percent, and an acrylamide content of 8.4 mol percent.

The product is called the present invention article No. 3.

Alternatively, the present invention articles Nos. 1 to 5 and the control articles Nos. 1 and 2 shown in Table 1 were obtained by adjusting the amounts of acrylamide and sodium hydroxide used. The control No. 2 was PVA obtained by alcoholyzing vinyl acetate polymer.

TABLE 1

[Binder—Alcoholysis reaction product of vinyl acetate-acrylamide copolymer]

| | Mol percent | | |
|---|---|---|---|
| | Acrylamide content | Alcoholysis degree of acetate group | Average polymerization degree |
| The present invention article No.: | | | |
| 1 | 4.5 | 99.0 | 1,080 |
| 2 | 6.6 | 99.5 | 1,120 |
| 3 | 8.4 | 99.7 | 1,200 |
| 4 | 10.8 | 88.2 | 1,200 |
| 5 | 19.8 | 99.0 | 1,180 |
| Control No.: | | | |
| 1 | 0.3 | 99.1 | 1,100 |
| 2 | 0 | 99.5 | 1,000 |

NOTE.—The present invention article No. 4 was obtained by using 1/80 mol equivalent of sodium hydroxide in alcoholysis.

The coating color was prepared as follows:

Tetrasodium pyrolic acid ($Na_4P_2O_7$) was dissolved sufficiently and clay was added gradually to the solution under vigorously stirring to form a uniform slurry and then an aqueous solution of binder shown in Table 1 was added thereto under stirring.

Next, the latex of styrene-butadiene copolymer was added thereto and was stirred for 40 to 60 minutes to obtain a sufficiently uniform dispersion.

The composition of coating color so obtained was shown in Table 2.

Sodium polyacrylate, carboxyl methyl cellulose, polyacrylamide, etc. were added thereto in the form of aqueous solution before adding the binder.

TABLE 2

[Parts by weight]

| Color Number | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Clay | 100 | 100 | 100 | 100 | 100 | 100 | 100 | 100 | 100 | 100 | 100 | 100 | 100 | 100 | 100 | 100 |
| Latex (pure) | 8 | 8 | 8 | 8 | 8 | 8 | 8 | 9 | 4 | 8 | 8 | 8 | 8 | 8 | 8 | 8 |
| Dispersing agent (tetratsodium pyrolinate) | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | |
| Control No 1 | 5 | | | | | | | | | | | | | | | |
| The present invention Article No.: | | | | | | | | | | | | | | | | |
| 1 | | 5 | | | | | | | | | | | | | | |
| 2 | | | 5 | | | | | | | | | | | | | |
| 3 | | | | 5 | | | | | | | | | | | | |
| 4 | | | | | 5 | | | | | | | | | | | |
| 5 | | | | | | 5 | | | | | | | | | | |
| Control No. 2 | | | | | | | 5 | | | 5 | 5 | 5 | 5 | 5 | 5 | 5 |
| Casein | | | | | | | | 9 | | | | | | | | |
| Starch | | | | | | | | | 18 | | | | | | | |
| Sodium polyacrylate (pure) | | | | | | | | | | 1.5 | 1.0 | | | | | |
| C.M.C | | | | | | | | | | | | 0.5 | 1.0 | | | |
| Polyacrylamide | | | | | | | | | | | | | | 0.5 | 0.75 | 1.0 |
| Solids concentration in color (percent) | 51 | 51 | 51 | 51 | 51 | 51 | 51 | 51 | 51 | 51 | 51 | 51 | 51 | 51 | 51 | 51 |

The following materials were employed as blending compounds in Table 2.

Clay: SPS, English China clay.

Latex: Dow latex #636. Styrene-butadiene copolymer latex manufactured by Dow Chemical Co.

Casein: New Zealand lactic casein.

Sodium polyacrylate: Allon A–20L manufactured by Toa Synthetic Chemical Industry Co.

Carboxymethyl cellulose: Cellogen WS–C manufactured by Dai-Ichi Industrial Pharmaceutical Co.

Starch: Esusan Sizer #500 manufactured by Aji-No-Moto Co.

The covering capacity of coating color, existence of patterns, viscosity in low shearing rate and pH of coating color measured on each coating color shown in Table 2 by means of an I.G.T. printability tester are shown in Table 3.

TABLE 3

| Color | Fluidity of color by I.G.T. (cm.) | Pattern | Low shearing CP (20° C.) 6 r.p.m. | Viscosity, 60 r.p.m. | pH in color |
|---|---|---|---|---|---|
| 1 | 16.2 | Exist | 10,200 | 2,060 | 8.69 |
| 2 | 18.0 | None | 9,800 | 1,800 | 8.78 |
| 3 | 18.0 | ...do... | 11,900 | 2,540 | 8.78 |
| 4 | 18.0 | ...do... | 13,100 | 3,020 | 8.65 |
| 5 | 19.5 | ...do... | 13,000 | 2,950 | 8.79 |
| 6 | 19.8 | ...do... | 19,400 | 4,300 | 8.81 |
| 7 | 14.8 | Remarkably | 10,700 | 2,160 | 8.64 |
| 8 | 17.0 | None | 48,800 | 11,500 | 9.40 |
| 9 | 19.0 | ...do... | 13,000 | 2,800 | 7.40 |
| 10 | 18.1 | Little | 8,960 | 1,720 | 8.59 |
| 11 | 18.5 | ...do... | 11,500 | 2,400 | 8.53 |
| 12 | 17.4 | ...do... | 24,000 | 4,120 | 8.62 |
| 13 | 15.2 | ...do... | 52,100 | 9,750 | 8.50 |
| 14 | 14.0 | Remarkably | 10,500 | 2,160 | 8.51 |
| 15 | 12.9 | ...do... | 12,500 | 2,350 | 8.10 |
| 16 | 12.3 | ...do... | 12,000 | 2,930 | 8.48 |

Note.—The covering capacity of coating color and existence of patterns were measured by means of the I.G.T. printability tester as follows: A piece of uncoated or base paper controlled by allowing to stand in the atmosphere of 20° C. and 65% RH for 24 hours was set in a sector to which the dise was contacted so as to be 10 kg./cm. of line pressure. Next, after dropping 0.1 cc. of coating color on the dise, the coating color was coated on the raw paper by driving the sector by means of a driver A (initial velocity 0 cm./sec., final velocity 270 to 300 cm./sec.), and thereafter the coated paper was dried in air and the total length of spreading (covering capacity of coating color) and the unevenness of coated surface (pattern) were measured.

The viscosity in low shearing rate was measured by using a BM type viscometer.

EXAMPLE 2

Figure 2:
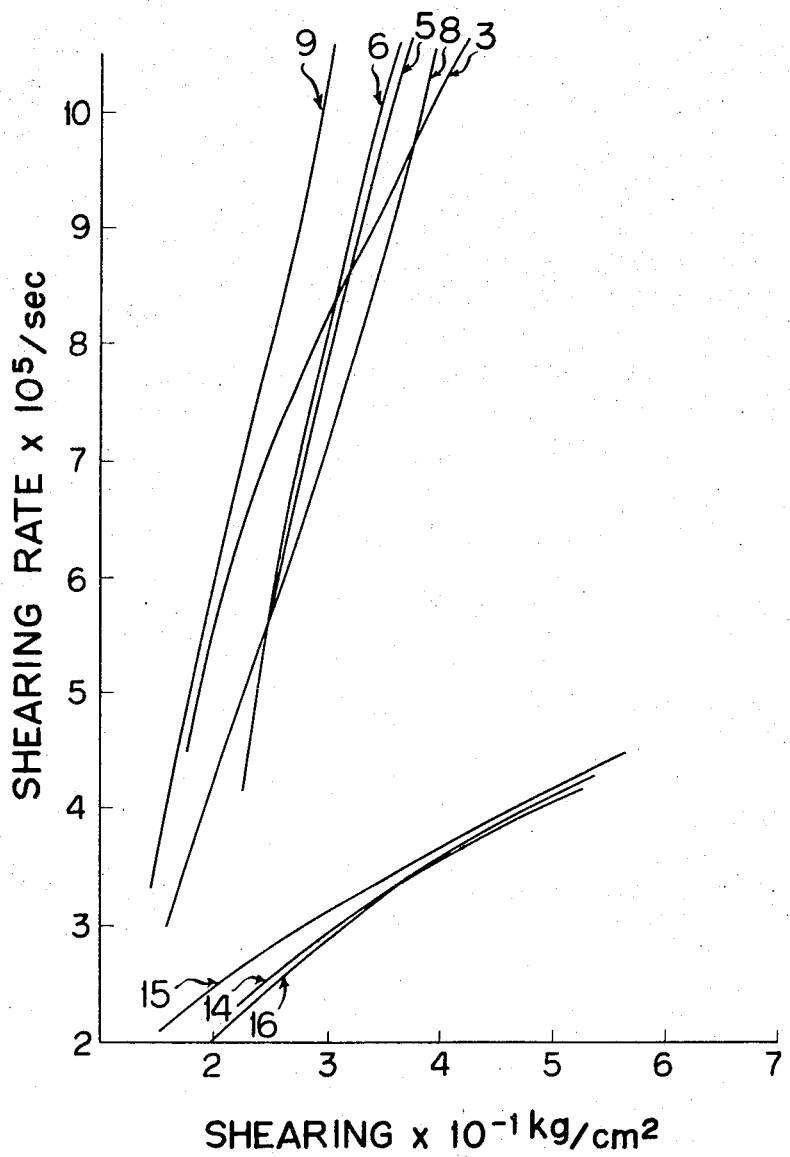

FIGS. 1 and 2 show the fluidity measured on the coating color in Table 1, Example 1 under a high shearing rate such as $10^5$ to $10^6$/sec. by means of a pressure capillary type high shearing viscometer. And it has been confirmed by various reports that such fluidity under high shearing rate can reproduce the coating workability under high speed and high shearing with good relationship. The figures in FIGS. 1 and 2 show the numbers of corresponding coating color.

From FIGS. 1 and 2 it is found that the fluidity curves of coating colors (Nos. 2, 3, 4, 5 and 6) using the pigment binder of the present invention are low in ratio of the increase of shearing stress to the increase of shearing rate and low in shearing stress at $10^6$ sec.$^{-1}$ similarly as in casein coating color (No. 8) and starch coating color (No. 9).

This shows that the coating color using the pigment binder of the present invention has excellent fluidity under high shearing rates. And also the coating color using the pigment binder of the present invention is clearly improved in fluidity under high shearing rates in comparison with the coating color (Nos. 10 and 11) using PVA-sodium polyacrylic acid mixture binder or the coating color (Nos. 12 and 13) using PVA-carboxylmethyl cellulose mixture binder.

EXAMPLE 3

Coating test and physical test for coated paper were carried out using the coating colors containing the present invention article No. 3 and the control No. 2 shown in Table 2, Example 1 and the coating color containing casein, as shown in Table 4.

TABLE 4

| | Coating color No. | | |
|---|---|---|---|
| | 17 | 18 | 19 |
| Kaolin clay | 100 | 100 | 100 |
| Latex (pure) | 8 | 8 | 7 |
| The present invention article No. 3 | 5 | | |
| Control No. 2 | | 5 | |
| Casein | | | 9 |
| Water proofing agent (pure) | 1 | 1 | 0.3 |
| Calcium stearate (pure) | 1 | 1 | 1 |
| Pigment dispersing agent | 0.4 | 0.4 | 0.4 |
| Fluorescence dye | Trace | Trace | Trace |
| Coating color solid (percent) | 55 | 55 | 55 |

The following materials were employed as blending compounds in Table 4.

Latex: Dow latex #636. Styrene-butadiene copolymer manufactured by Dow Chemical Co.

The control No. 2: Average polymerization degree 1000. Alcoholysis degree 99.5 mol percent.

Water-resisting agent: Sumirez resin #613. Methylated methylol melamine manufactured by Sumitomo Chemical Industry Co.

Calcium stearate: DEF922 manufactured by Nisshin Chemical Co.

Pigment dispersing agent: Tetrasodium pyrophosphate manufactured by Taiyo Chemical Industry Co.

The base paper on which the coating color in Table 4 is coated and the coating conditions are as follows.

Base paper: 102 g./cm.$^2$.

Coating machine: Flexible trailing blade manufactured by Black Clauson Co. Coater coating width 1625 mm. Both side coating.

Coating speed 270 m./min.

Coating color Nos. 17, 18 and 19 in Table 4 were coated each 12,000 m. under the above conditions.

Hereinafter each coated papers were called Nos. 17, 18 and 19.

In the paper coated with No. 18 streaks were observed over the total width of the coated surface while in the paper coated with No. 17 or No. 19 streaks or patterns were not found.

When these coated papers were treated by a super calender under a line pressure of 200 kg./cm. and velocity of 250 m./min., the paper coated with No. 17 or No. 18 has good workability while in the paper coated with No. 19 dusting occurred.

Streaks which occurred in paper coated with No. 2 remained after super calendering.

Physical properties of these coated papers are as follows:

TABLE 5

| | Coated paper No. | | |
|---|---|---|---|
| | 17 | 18 | 19 |
| Average coated amount (one side g./cm.$^2$) | 12.2 | 11.9 | 12.5 |
| Surface strength (cm./sec.) | 135.2 | 131.0 | 112.4 |
| Brightness | 170.1 | 167.9 | 140.4 |
| Whiteness (percent) | 83.0 | 83.4 | 81.8 |
| Gloss of coating paper coated with four colors | 218.1 | 225.5 | 192.6 |

NOTE.—
1. The measurement of surface strength was conducted under coating pressure 50 kg. and spring drive A at 20° C. and 65% RH using an ink (made by Toyo Ink Co.) of tack value 25 for picking test as a picking ink by using I.G.T. printability tester according to TAPPI Standard T 499, Su-64.
2. The brightness was measured its gloss of mirror surface at 25° C. by means of photovolt testing machine and was shown with the light reflection index.
3. The whiteness was shown with light reflection percentage of test paper in comparison with the reflection percentage 100 of magnesium oxide white panel at a wavelength of 475 m$\mu$ by using a photovolt testing machine.
4. The gloss of quadruplex color coated paper was determined by transferring a coating into on the test paper at the coating pressure of 25 kg./cm. in order of yellow, red, blue and black and, after allowing to stand for 24 hours, measuring the gloss of the surface of coated paper by means of I.G.T. printability tester. Trade mark "Jet King G process H" made by Toyo Ink Co. was used as an ink and "Jet King G 92" was used as a black ink.

From the above results it is clear that the present invention article No. 3 does not give rise to streaks in coating and dusting in super calendering, and is excellent in surface strength, opacity, whiteness, and gloss after coating.

EXAMPLE 4

The polymerization liquid consisting of 5250 parts of vinyl acetate, 3250 parts of methanol, 9.3 parts of azobisisobutyronitrile and 5 parts of acetic acid was supplied in a polymerization vessel while replacing nitrogen. After heating, when the reflux from a water-cooling reflux condenser started, the mixture solution of 950 parts of vinyl acetate and 550 parts of methanol containing 381 parts of acrylamide was added thereto for 3 hours, the stirring velocity being 100 r.p.m.

After the addition of the mixture solution containing acrylamide was completed, the polymerization reaction was continued for 5 hours to obtain a solution of vinyl acetate-acrylamide copolymer in methanol, and thereafter, about 20% of unpolymerized monomer (vinyl acetate)

was removed by the conventional method. Next, the concentration of copolymer in the solution was adjusted to 40% by adding methanol thereto, and then sodium hydroxide of 1/25 mol equivalent to vinyl acetate contained in the copolymer was added thereto and the alcoholysis reaction was carried out at a temperature of 40° C. for 2 hours. The alcoholized copolymer so obtained was a white powder having polymerization degree of about 1100, acetate group alcoholysis degree of 99.0 mol percent and acrylamide content of 7.5 mol percent. This product is referred to hereinafter as the present invention article No. 6.

Another product, hereinafter as the present invention article No. 7 in which the alcoholysis degree of acetate groups in said copolymer is 89.0 mol percent was obtained by varying the amount of sodium hydroxide to be added in the above mentioned alcoholysis reaction and the control article No. 3 was obtained by polymerizing vinyl acetate without adding acrylamide and thereafter alcoholizing it.

Alternatively, the polymerization liquid consisting of 5250 parts of vinyl acetate, 3250 parts of methanol, 9.3 parts of azobisisobutyronitrile, and 5 parts of acetic acid was supplied into a polymerization reaction vessel under replacing nitrogen. After heating, when the reflux from a water-cooling reflux condenser started, the mixture solution of 950 parts of vinyl acetate containing 254 parts of acrylamide and 254 parts of acrylic acid and 550 parts of methanol was added for 3 hours. After the addition of the mixture solution was completed, the polymerization reaction was further continued for 5 hours to obtain a solution of vinyl acetate-acrylamide-acrylic acid copolymer in methanol, and thereafter, 20% of unpolymerized monomer (vinyl acetate) was removed by the conventional method.

Next, the concentration of copolymer in the solution was adjusted to 40% by adding methanol thereto, and then sodium hydroxide of 1.25 mol equivalent to vinyl acetate contained in the copolymer was added thereto and the alcoholysis reaction was carried out at a temperature of 40° C. for 2 hours. The alcoholized copolymer so obtained was a white powder having a polymerization degree of about 1100, alcoholysis degree of acetate groups of 98.9 mol percent, and acrylamide content of 5.4 mol percent and sodium acrylate content of 5.2 mol percent. This is designated hereinafter as present invention article No. 8.

The alcoholysis product of vinyl acetate-acrylic acid copolymer which was obtained by the same method as in the above-mentioned reaction except acrylamide was not employed is designated as control article No. 4.

TABLE 6
[Alcoholysis product of copolymer]

| | Acrylamide content (mol percent) | Acrylic acid + sodium acrylate content (mol percent) | Alcoholysis degree of acetic acid group | Average polymerization degree |
|---|---|---|---|---|
| The present invention article No.: | | | | |
| 6 | 7.5 | 0.8 | 99.0 | 1,120 |
| 7 | 7.9 | 0.3 | 89.0 | 1,140 |
| 8 | 5.4 | 5.2 | 98.9 | 1,100 |
| Control No.: | | | | |
| 3 | 0 | 0 | 99.4 | 1,180 |
| 4 | 0 | 8.2 | 99.1 | 1,120 |

Next, the paper coated with the coating color made by using each article described in Table 6 as a paper coating pigment binder and adding an increasing water strength agent thereto was tested for water-resistance. The preparation of the coating colors were carried out as followed.

Tetrasodium pyrolinate was dissolved in water and clay was gradually added thereto under vigorously stirring to prepare a homogeneous slurry. After which, the binder described in Table 6 was added thereto, and subsequently a styrene butadiene copolymer was added, and then was stirred from 40 to 60 minutes to form a homogeneous dispersion system. Next, a water-resisting agent was added and stirred for 40 minutes more. Each coating color so obtained is shown in Table 7 (the part was shown by weight except in a water-resisting agent).

TABLE 7

| Color Number | 20 | 21 | 22 | 23 | 24 | 25 | 26 | 27 | 28 | 29 | 30 |
|---|---|---|---|---|---|---|---|---|---|---|---|
| Clay | 100 | 100 | 100 | 100 | 100 | 100 | 100 | 100 | 100 | 100 | 108 |
| Latex (pure) | 8 | 8 | 8 | 8 | 8 | 8 | 8 | 8 | 8 | 8 | 0 |
| Tetrasodium phosphate | 0.4 | 0.4 | 0.4 | 0.4 | 0.4 | 0.4 | 0.4 | 0.4 | 04. | 0.4 | 0.4 |
| The present invention article No.: | | | | | | | | | | | |
| 6 | 5 | 5 | 5 | 5 | 5 | | | | | | |
| 7 | | | | | | 5 | 5 | | | | |
| 8 | | | | | | | | 5 | 5 | | |
| Control No.: | | | | | | | | | | | |
| 3 | | | | | | | | | | 5 | 5 |
| 4 | | | | | | | | | | | 5 |
| Water-resisting agent: | | | | | | | | | | | |
| (1) | | 6 | 10 | | | 6 | 6 | 15 | | | 10 |
| (2) | | | | 10 | | | | | 15 | | |
| (3) | | | | | 10 | | | | | 15 | |

NOTES.—
1. Water-resisting agent: (1) Sumirez Resin #613, melamine-Formalin resin manufactured by Sumitomo Chemical Industry Co. (methylated methylol melamine); (2) Bekkamin P-685 LV, urea-Formalin resin manufactured by Dai-Nippon Ink Chemical Industry Co.; (3) Glyoxal, Dialdehyde compound, manufactured by Union Carbide Co. The amount of water-proofing agent added is the weight percentage of pure content for binder shown in Table 7.
2. Latex: Dow Latex 636. Styrene-butadiene copolymer latex manufactured by Dow Chemical Co.
3. Clay: SPS English China clay.
4. pH in each coating color is in the range of 8.3 to 8.9.

Next, each coating color shown in Table 9 was coated on the same paper in the rate of 15 to 18 g./m.² by means of a blade-coater, and thereafter was cured at 105° C. for 3 minutes, and further was super calendered under the conditions of 70° C. in temperature, 120 kg./cm. in line pressure and 60 m./min. in velocity, and then, after allowing to stand at a constant temperature and moisture of 20° C. and 65% RH, its water-resistance was measured. The results were shown in FIGS. 3 and 4. (In the figures, the figures show the coating color numbers.) The water-resistance was determined by means of Taber Abrasion Tester Type 503 by abrasing the surface of coated paper wetted with about 10 cc. of water by a load of 125 g. in the constant rotation numbers (50 and 100 rotations), washing the abrased surface of coated paper with water, adjusted the turbid washing water accurately to 100 cc. and measuring the degree of turbidity of this solution by measuring the transparency of light at 460 m$\mu$ wave length therethrough with the light transparency through the pure water being 100%.

Figure 3:
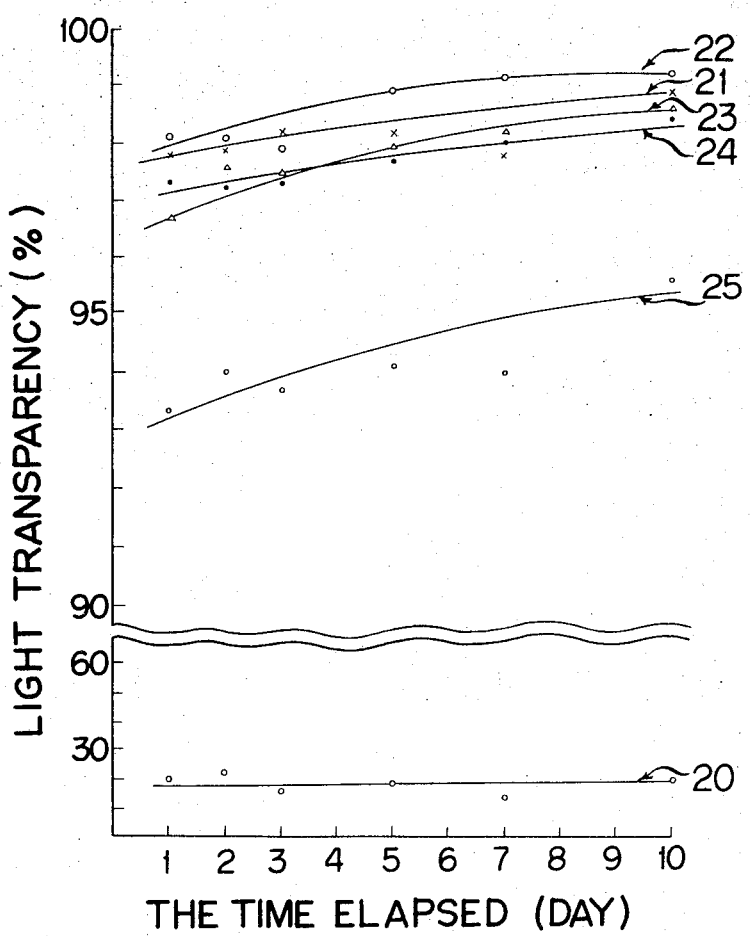
FIG. 3 to FIG. 8 show water-resistance of paper coated by pigment using the compositions in this invention as the binder.
Figure 4:
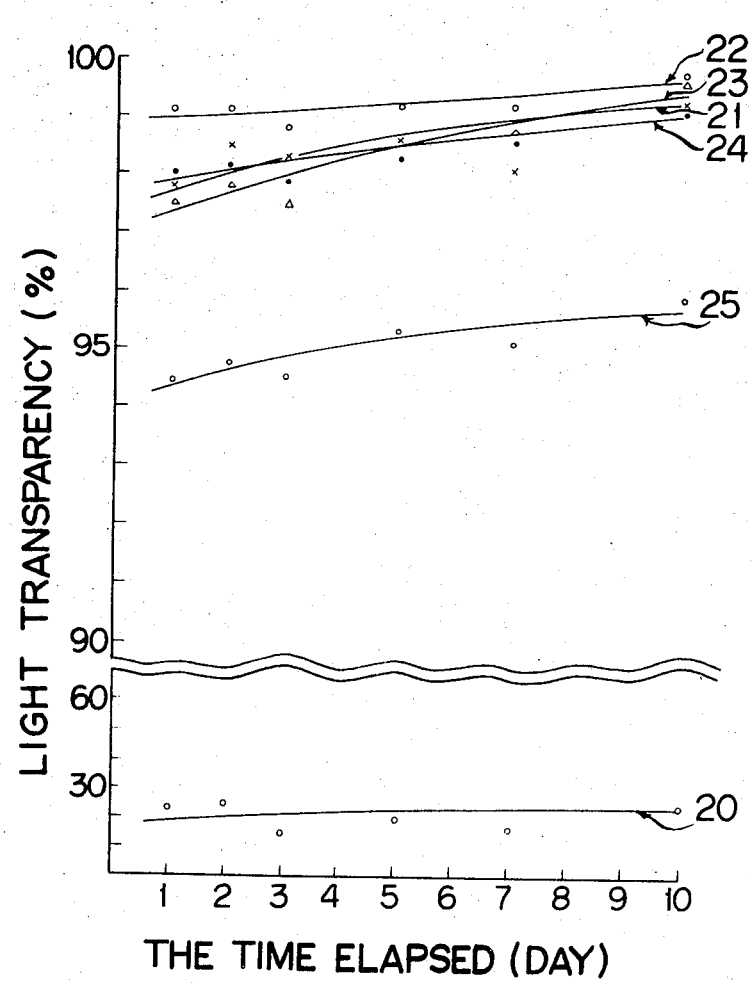

The lower the water-resistance of the binder used is, the lower the light transparency of the coated paper using the binder is. FIGS. 3 and 4 show the water-resistance, measured on coating color Nos. 20 to 25 in rotation numbers of 100 and 50, respectively. The coating color (No. 20) not using a water-resistant agent was very good in coating workability as shown in Examples 12 and 13 but was poor in water-resistance. Hence, the color (No. 20) should be employed in case of not so requiring the water-resistance.

Figure 5:
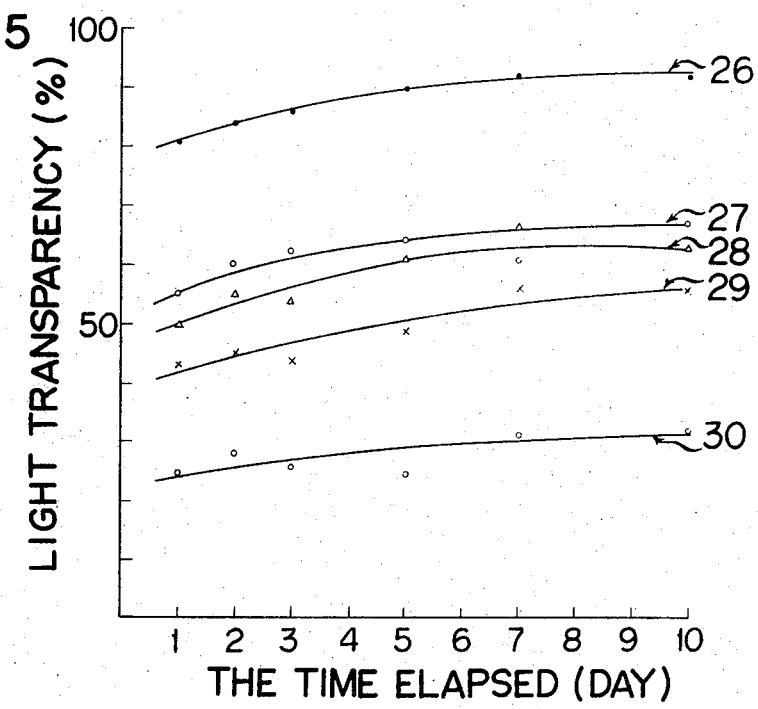
Figure 6:
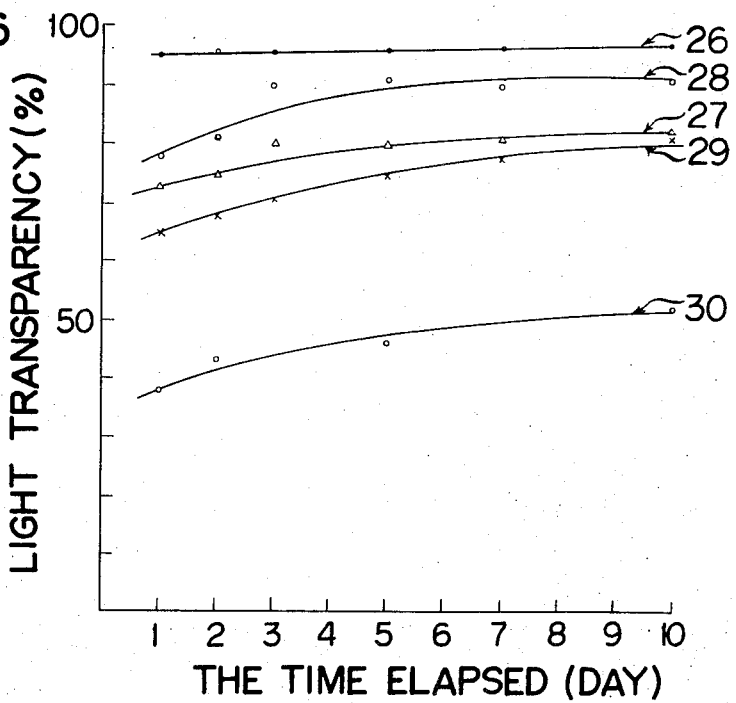

Similarly, FIGS. 5 and 6 show the water-resistance measured on coating color Nos. 26 to 30 in rotation numbers of 100 and 50, respectively.

The coating colors (Nos. 27 to 29) using the control No. 3 is inferior to the coating color (No. 26) using the present invention article No. 8, and the coating color (No. 30) using the control No. 4 is more inferior. On the other hand, the coating colors (Nos. 31, 32 and 33) shown in Table 8 were obtained in the same manner as in Table 7 using the present invention article No. 6.

TABLE 8

|  | Coating color No. | | |
|---|---|---|---|
|  | 31 | 32 | 33 |
| Clay | 100 | 100 | 100 |
| Latex (pure) | 8 | 8 | 8 |
| Tetrasodium phosphate | 0.4 | 0.4 | 0.4 |
| The present invention article No. 6 | 5 | 5 | 5 |
| Water-resistant agent | 8 | 8 | 8 |
| pH | 7.5 | 8.5 | 9.5 |

NOTES.—
1. Water-resistant agent: Sumirez Resin #613, methylated methylol melamine.
2. Latex: Dow Latex #636.

The stabilities of coating colors shown in Table 8 allowed to stand at an ordinary temperature were shown in Table 9–(1) and (2).

TABLE 9–(1)

|  | Coating color No. | | |
|---|---|---|---|
|  | 31 | 32 | 33 |
| 6 r.p.m. (cp.) | 12,000 | 14,000 | 15,500 |
| 60 r.p.m. (cp.) | 2,775 | 3,050 | 3,170 |
| pH | 7.5 | 8.5 | 9.5 |

NOTE.—r.p.m. shows rotation numbers of Type B visco-meter.

TABLE 9–(2)

[Measurement after 48 hours from that in Table 9–(1)]

|  | Color No. | | |
|---|---|---|---|
|  | 31 | 32 | 33 |
| 6 r.p.m. (cp.) | 12,500 | 14,000 | 15,800 |
| 60 r.p.m. (cp.) | 2,950 | 3,100 | 3,300 |
| pH | 7.7 | 8.6 | 9.4 |

Figure 7:
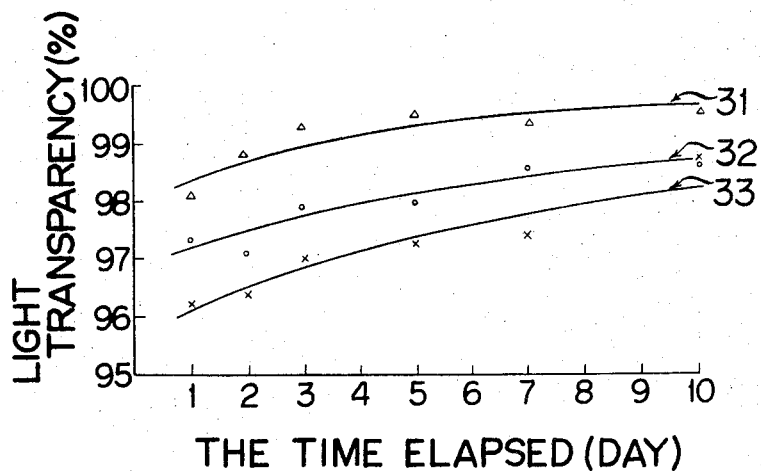
Figure 8:
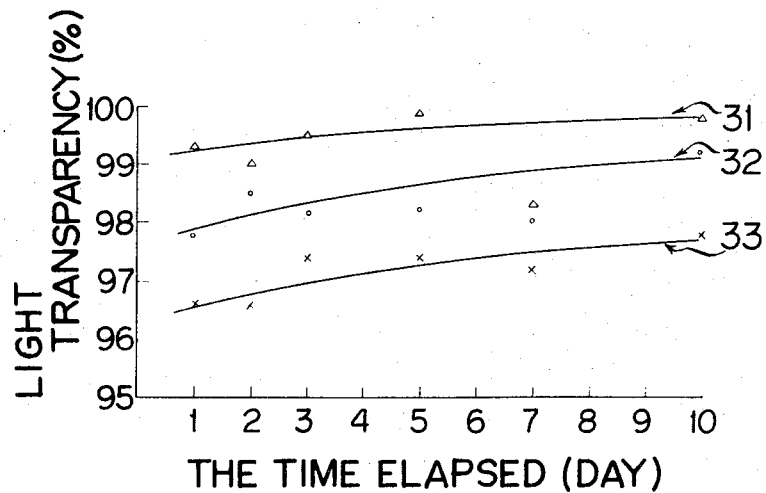

The water-resistance measured on colors described in Table 8 were shown in FIGS. 7 (100 r.p.m.) and 8 (50 r.p.m.).

Even in pH 9.5 sufficient water-resistance was observed.

What is claimed is:

1. An aqueous composition effective as a paper coating binder consisting essentially of the powdery product obtained by alcoholizing more than 75 mol percent of acetate groups contained in a vinyl acetate-acrylamide copolymer, in which the acrylamide content in said copolymer is 1 to 30 mol percent, and 1 to 30% by weight, based on said product, of a member selected from the group consisting of melamine Formalin resin, urea Formalin resin and benzoguanamine Formalin resin as a water-resistant agent.

2. An aqueous composition as set forth in claim 1 in which the water-resistant agent is melamine Formalin resin.

3. An aqueous composition as set forth in claim 1 in which the water-resistant agent is urea Formalin resin.

4. An aqueous composition effective as a paper coating binder consisting essentially of the powdery product obtained by alcoholizing more than 75 mol percent of acetate groups contained in a copolymer of vinyl acetate, acrylamide, and at least one other ethylenically unsaturated monomer copolymerizable with vinyl acetate and acrylamide, in which the content of acrylamide and said other monomers in said polymer being 1 to 30 mol percent and 1 to 30 weight percent based on said product of a member selected from the group consisting of melamine Formalin resin, urea Formalin resin and benzoguanamine Formalin resin as a water-resistant agent.

5. An aqueous composition as set forth in claim 4 in which the water-resistant agent is melamine Formalin resin.

6. An aqueous composition as set forth in claim 4 in which the water-resistant agent is urea Formalin resin.

7. An aqueous composition as set forth in claim 4, in which the copolymerizable monomer is acrylic acid.

References Cited

UNITED STATES PATENTS

| 2,653,140 | 9/1953 | Allenby et al. | 260—29.4 UA |
| 3,301,809 | 1/1967 | Goldberg et al. | 260—29.4 |
| 3,345,318 | 10/1967 | Lindemann et al | 260—29.4 |
| 3,352,838 | 11/1967 | Toepfl et al. | 260—29.4 |

HAROLD D. ANDERSON, Primary Examiner

U.S. Cl. X.R.

117—155 L, 155 UA; 260—17 R, 17.4 ST, 29.6 B, 29.6 H, 29.6 TA, 29.6 WA, 29.7 WA, 851